(12) United States Patent
Hartkamp et al.

(10) Patent No.: US 7,818,071 B2
(45) Date of Patent: Oct. 19, 2010

(54) METHOD FOR CONTROLLING AND/OR OPTIMIZING PRODUCTION OF OIL AND/OR GAS WELLS AND FACILITIES

(75) Inventors: Peter Laurens Hartkamp, The Hague (NL); Sebastiaan Arnold Paul Joseph Hendriksen, Rijswijk (NL)

(73) Assignee: Shell Oil Company, Houston, TX (US)

( * ) Notice: Subject to any disclaimer, the term of this patent is extended or adjusted under 35 U.S.C. 154(b) by 386 days.

(21) Appl. No.: 11/831,666

(22) Filed: Jul. 31, 2007

(65) Prior Publication Data

US 2008/0059002 A1    Mar. 6, 2008

(30) Foreign Application Priority Data

Aug. 30, 2006   (EP)   .................................. 06119833

(51) Int. Cl.
*G05B 15/02*    (2006.01)
*G05B 13/02*    (2006.01)
*G06F 19/00*    (2006.01)
*G05D 23/00*    (2006.01)
*E21B 49/00*    (2006.01)

(52) U.S. Cl. .......................... 700/9; 73/152.06; 700/29; 700/95; 700/299

(58) Field of Classification Search .................... 700/95, 700/9, 29, 299; 73/152.06
See application file for complete search history.

(56) References Cited

U.S. PATENT DOCUMENTS

| 6,012,016 | A | 1/2000 | Bilden et al. ................... 702/12 |
| 7,136,716 | B2* | 11/2006 | Hsiung et al. ............... 700/104 |
| 7,406,431 | B2* | 7/2008 | Spira et al. ..................... 705/7 |
| 2003/0172002 | A1* | 9/2003 | Spira et al. ................... 705/27 |
| 2004/0153437 | A1* | 8/2004 | Buchan ......................... 707/1 |
| 2006/0092766 | A1* | 5/2006 | Shelley et al. ................ 367/72 |

FOREIGN PATENT DOCUMENTS

| EP | 1637695 | 3/2006 |
| WO | WO9960247 | 11/1999 |

* cited by examiner

*Primary Examiner*—Albert DeCady
*Assistant Examiner*—Thomas H Stevens

(57) ABSTRACT

This invention discloses a system for controlling and optimizing production operations oil and/or gas production wells and facilities, which are equipped with sensors that generate raw reservoir, production and/or production equipment performance data. This system collects raw data processes it in a central data center to produce component data and system performance data.

4 Claims, 1 Drawing Sheet

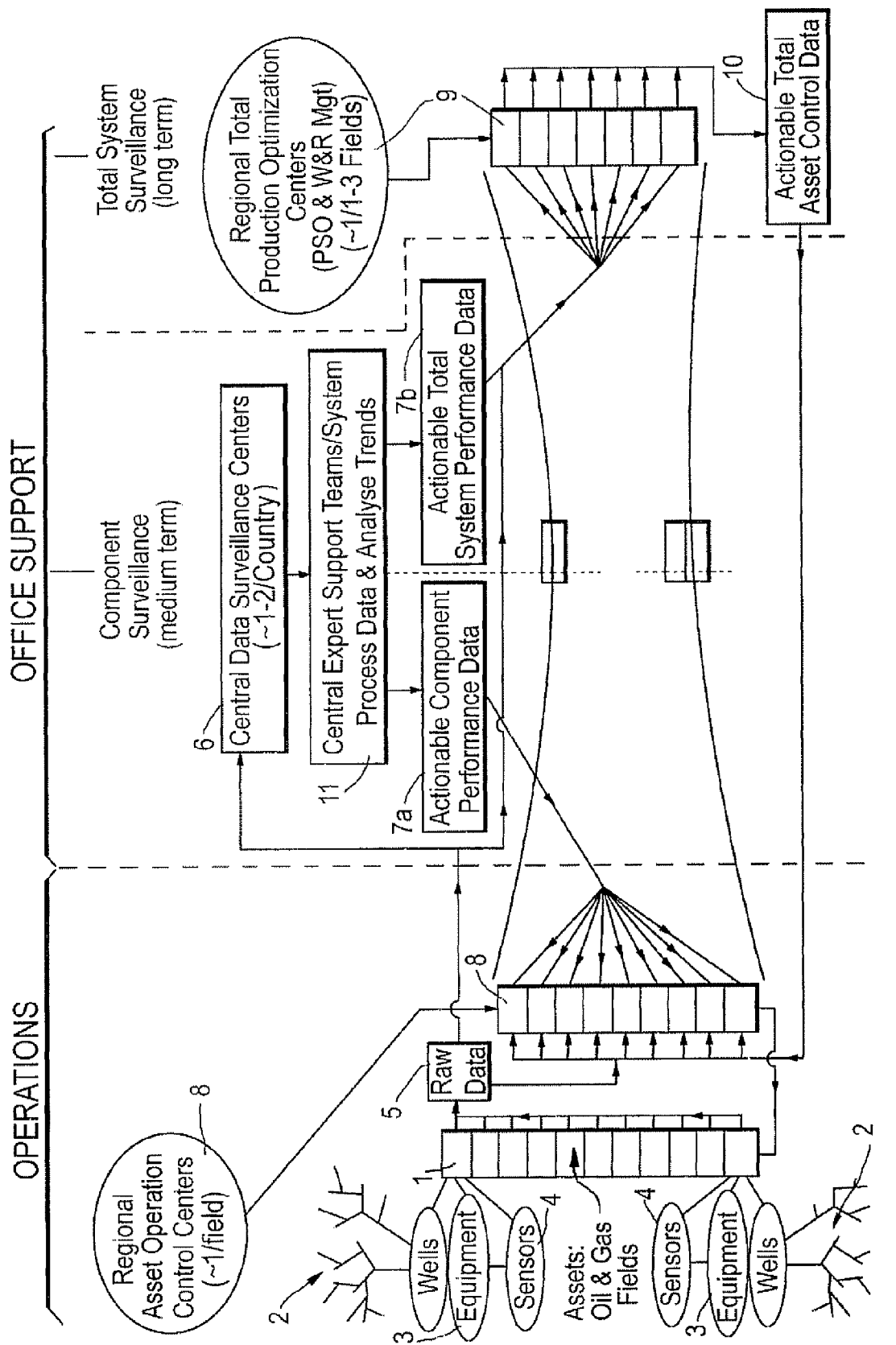

US 7,818,071 B2

METHOD FOR CONTROLLING AND/OR OPTIMIZING PRODUCTION OF OIL AND/OR GAS WELLS AND FACILITIES

RELATED CASES

This case claims priority from European Application No. 06119833.9, filed 30 Aug. 2006, which is incorporated herein by reference.

FIELD OF THE INVENTION

The invention relates to a method for controlling and/or optimizing oil and/or gas operations in various oil and/or gas production wells and facilities. More particularly the invention relates to a method for controlling and/or optimizing reservoir depletion and/or production in a plurality of oil and/or gas wells, pipelines and/or other production equipment and facilities, which are used to produce oil and/or gas from various oil and/or gas reservoirs and which are provided with a significant amount of production, pressure, temperature, vibration, flow, seismic and/or other sensors, which generate a significant amount or raw reservoir and/or production and/or production equipment performance data.

BACKGROUND OF THE INVENTION

A problem is that for each asset a large amount of raw data may be generated and that the analysis and further processing of these raw data into actionable data that can be handled by operators in production operation control centers is a time consuming activity and/or may require significant computing performance and/or input from expert teams and/or automated expert systems.

It is an object of the present invention to alleviate this problem and to provide an efficient method for converting raw reservoir depletion, production and/or production equipment performance data into actionable data.

It is a further object of the present invention to provide an efficient method for converting raw reservoir depletion, production and/or production equipment performance data into actionable data in a consistent and efficient manner, and such that data surveillance software may be used and operated in one or only a few central data surveillance centers, which may be operated on a substantially continuous basis.

SUMMARY OF THE INVENTION

In accordance with the invention there is provided a method for controlling and optimizing production operations in various clusters of oil and/or gas production wells and facilities, which are equipped with production, pressure, temperature, vibration, flow, seismic and/or other sensors that generate raw reservoir, production and/or production equipment performance data, the method comprising:

collecting said raw data in at least central data surveillance center;

processing, monitoring and/or analyzing trends in said collected raw data by at least one central expert support team and/or system, which converts these data and/or trends into actionable component data and total system performance data;

transferring said actionable component performance data to at least one regional asset operation control center;

transferring said actionable total system performance data to at least one regional total production optimization center, in which said actionable total system performance data and trends in said data are interpreted, analysed and converted into actionable total asset control data that are subsequently transferred to at least one regional control center; and optimizing and/or controlling production of said clusters by action taken in at least one regional asset operation control center on the basis of the actionable component performance data and the actionable total asset control data.

The actionable total asset control data may comprise both short term and long term reservoir depletion and/or production optimization data, which may range from short term (1-90 days) to lifecycle (90 days to end of asset life) total production optimization data.

These and other features, embodiments and advantages of the method according to the invention are described in the attached claims, abstract and the following detailed description of preferred embodiments in which reference is made to the accompanying drawing.

When used in this specification and claims the following terms shall have the following meanings:

1. "Asset operation control" is the function, which takes care of controlling the production flow from the reservoirs through the wells and facilities to a point of transfer. Purpose of this function is to ensure the planned production is realized efficiently within the safety and operational boundaries of all equipment. Other expressions used to describe this function or parts thereof are: Production operation centre, remote control centre and operations centre.

2. "Production surveillance" is the function of processing, analyzing and comparing data from reservoir, wells and facilities. Purpose of this function is two fold a) to identify potential problems timely so they could be prevented and b) to provide options and/or advice for equipment and sub-system optimization to the asset control function and/or total production optimization function. Other expressions used to describe this function or parts thereof are: production monitoring, equipment monitoring, well and reservoir surveillance, big room.

3. "Total Production optimization" is optimizing the depletion of the reservoirs together with optimization of the use of the infrastructure. The function takes care of receiving the options and advise from the surveillance centre to optimize, by using historic asset data and by applying the relevant (sub)system models individually the reservoir and/or wells and/or pipelines and/or other production equipment, and/or to optimize any combination of the above; leading to decisions on how the total production can be optimized. Other expressions used to describe this function or parts thereof can be: production optimization, well and reservoir management, well modeling, integrated production system modeling, production optimization, well and reservoir surveillance, asset decision centre, collaborative work environment, collaborative work centre.

4. A "center" is the location where a function is performed.

BRIEF DESCRIPTION OF THE DRAWING

For a more detailed understanding of the invention, reference is made to the accompanying Figure, which is a schematic representation of an operations scheme of a range of oil and/gas assets which are connected to a small number of central data surveillance centers in which the method according to the invention is applied.

DETAILED DESCRIPTION OF A PREFERRED EMBODIMENT

Referring to the Figure, there is shown a series of oil and/or gas assets 1, in which a range of oil and/or gas production and/or injection wells 2 and production equipment 3 is used to produce crude oil and/or gas.

In each asset a large amount of reservoir, production and equipment monitoring sensors 4 may be employed to monitor the performance of the reservoirs, wells, and associated well and other production equipment and the depletion of the oil and/or gas reservoirs.

These monitoring sensors may generate a large amount of raw data 5, which are transferred to a small number of central data surveillance centers 6 in which the raw data 5 of sensors 4 of a plurality of oil and/or gas assets are collected, analyzed, compared and converted into data that are checked and divided by one or more central expert support teams and/or partly or fully automated expert systems 11, which systems may be updated and/or modified by expert support teams from time to time, into actionable component performance data 7A and total system performance data 7B. The component performance data 7A are directly transferred to the appropriate regional asset operations control center 8. The actionable total system performance data 7B are transferred to an appropriate regional total production optimization center 9 in which the depletion of the oil and/or gas reservoirs 1 may be monitored and linked to reservoir depletion models such that actionable asset control data 10 are generated that are transferred to the regional asset operation control centers 8, such that these regional asset operation control centers 8 are induced to control oil and/or gas production from the various reservoirs 1 such that the depletion of the reservoirs and/or total production and the performance of all wells, equipment and facilities is optimized.

In the regional total production optimization centers 9 algorithms disclosed in International patent applications WO2006048418 and WO2006003118 may be used to convert the actionable reservoir data into reservoir models and to update these reservoir models from time to time and to convert the data generated by these reservoir models about the desired and actual flux of crude oil, natural gas and/or other fluids through the reservoir into actionable asset control data 10, that are subsequently transferred to the appropriate regional asset operation control center 8 for implementation.

It is preferred but not required that all sensors 4, all equipment control both for surface as well as sub-surface well and reservoir and other components are connected the asset control system and that data is transferred from there to data historians, linked to one or more central data surveillance centers 6.

For surveillance and optimisation purposes all relevant actionable data 7 and the raw data 5 from any exception system is preferably copied into the assets Data Historian.

To allow for tasks to be performed by staff in the regional asset operation control centers 8 a web services layer may be put in place.

In the method according to preferred embodiments, operations may be performed on the following basis:

In multiple (but standard) central data surveillance centers 6 multiple routine surveillance tasks are performed the number of central data surveillance centers is more than three times smaller than the number or regional asset operation control centers and/or the number of regional total production optimization centers; each center 8 serving a number of assets, leading to better quality job, executed with the agreed frequencies, with quality information for the relevant teams in the Regional Total Production Optimisation Centers 9 and leading to cross asset learning of similar issues occurring in similar situations and/or similar equipment.

Over time a growing number of aspects are expected to become suitable for such remote surveillance services approach.

Regional total production optimization centers 9 permit an efficient, consistent, and integrated asset decision making, for ensuring safety of production processes, and for timely changing the production parameters as and when required.

Advantages of using Central Data Surveillance Centers 6 include but are not limited to:

1) Enabling the system to go from a 5×8 (five working day per week with eight working hours) ad hoc surveillance and analytical analyses of performance of individual equipment items and reactive maintenance to 7×24 continuous asset surveillance.

2) Surveillance and relative performance analysis by comparing performance of similar pieces of equipment 3, resulting in proactive maintenance plans and less overall down-time.

3) Clarity about roles & responsibilities by splitting tasks in the boxes as indicated in the Figure. This also allows optimization for each box: which tasks are performed by an oil and/or gas asset operator in-house, and what tasks does an operator delegate to third party contractors and consultants.

4) The development of workflows supporting the proper execution of the communication between the boxes shown in the Figure, regardless of who executes the tasks (in house or third party staff).

5) The availability of and recognition of rapid progress in automated tools that can execute many of the activities currently executed manually (if at all).

6) The present invention involves change in deployment of technology, including pushing individual technologies into individual Asset team organisations, and delivering these technologies as services provided by (OU/Regional) centralised services teams, reducing deployment time & cost, reducing training time, and increasing the use and benefits of such tools.

7) The oil and/gas industry is very focused on getting system-wide models and simulation going. One factor is that the basic raw and actionable data streams 5 and 7 are there and are constantly quality controlled. That is a function for and a side effect of having the central data surveillance centers 6 in place.

It will further be understood that the method according to the invention facilitates consistent and efficient operation of oil and/or gas assets by using:

1) Remote control of oil and/gas assets in regional asset operation control centers 8;

2) Centralised Surveillance, underpinned by central expert support teams 11 in a small number of central data surveillance centers 6; and 3) Regional total optimisation centers 9, in which actionable total system performance data 7B are analysed and processed in computerized reservoir and total system performance optimisation models.

In the method according to the invention all staff derives information from a single raw data set 5, which may contain a huge amount of data that cannot be handled by a single person or team, and which are converted in at least one central data surveillance center 6 in a series of actionable component and total system performance data 7A and 7B that selectively presented to operators and/or experts, who have role based access to the generated actionable data 7A and 7B, and which data may be presented using ontology based visualisation techniques.

The actionable component performance data 7A generated by the central data surveillance center or centers 6 may be subdivided into well data, pipeline data (flow and trunk lines), static equipment data and rotating equipment data (pumps, compressors and engines) that are presented to various operators and/or production supervising and/or maintenance staff in the regional asset operation control centers 8.

Surveillance per piece of (rotating or static) equipment may comprise the following actions:

a) check the quality of the data in a data historian b) review data trends over time c) compare trends with lower and upper limits and models d) analyse deviations from models e) analyse cause of deviation and possible corrective action f) if needed, relate, by exemption, to expert teams 11 for corrective action advice g) inform optimization function of deviations and advice h) store cause analysis and advice in a data historian.

It will be understood that it is useful to have in each central data surveillance center 6 a database that contains an automated data historian, in which the trail of actions is stored, which actions may be partially or fully automated, to convert the raw data 5 into actionable component data 7A and total system control data 7B, which include reservoir depletion data as well as component performance data, including, equipment, well and surface facility data.

It is observed that in the method according to the invention the regional asset operation control centers 8 provide operational control of the oil and gas fields 1 and that the central surveillance centers 6, the central expert support teams and/or systems 11 and the regional total production optimization centers 9 provide office support to these operations, which support can be divided into medium term component surveillance provided by the actionable component performance data 7A and long term total system surveillance provided by the actionable total asset control data 7A.

What is claimed is:

1. A method for controlling and optimizing production operations in clusters of oil and/or gas production wells and facilities, which are equipped with production, pressure, temperature, vibration, flow, seismic and/or other sensors that generate raw reservoir, production and/or production equipment performance data, the method comprising:
    a) collecting said raw data in a number of central data surveillance centers;
    b) processing, monitoring and/or analyzing trends in said collected raw data by at least one central expert support team and/or system, which converts these data and/or trends into actionable component data and total system performance data;
    c) transferring said actionable component data to at least one regional asset operation control center;
    d) transferring said actionable total system performance data to at least one regional total production optimization center, in which said actionable total system performance data and trends are interpreted, analysed and converted into actionable total asset control data that are subsequently transferred to at least one regional control center; and
    e) optimizing and/or controlling production of said clusters by action taken in at least one regional asset operation control center, said optimization and/or controlling being based on the actionable component data and the actionable total asset control data;
        wherein the number of central data surveillance centers is more than three times smaller than the number of regional asset operation control centers and/or the number of regional total production optimization centers.

2. A method for controlling and optimizing production operations in clusters of oil and/or gas production wells and facilities, which are equipped with production, pressure, temperature, vibration, flow, seismic and/or other sensors that generate raw reservoir, production and/or production equipment performance data, the method comprising:
    a) collecting said raw data in at least one central data surveillance center;
    b) processing, monitoring and/or analyzing trends in said collected raw data by at least one central expert support team and/or system, which converts these data and/or trends into actionable component data and total system performance data;
    c) transferring said actionable component data to at least one regional asset operation control center;
    d) transferring said actionable total system performance data to at least one regional total production optimization center, in which said actionable total system performance data and trends in said actionable total system performance data are interpreted, analysed and converted into actionable total asset control data that are subsequently transferred to at least one regional control center; and
    e) optimizing and/or controlling production of said clusters by action taken in at least one regional asset operation control center, said optimization and/or controlling being based on the actionable component data and the actionable total asset control data;
        wherein at least one central expert support team and/or system associated with said at least one central data surveillance center monitors data relating to vibration, temperature, pressure and/or other data about the oil and/or gas production and/or operations of pumps, compressors and/or other rotating equipment deployed in the oil and/or gas production and/or injection wells, pipelines and/or production facilities of various assets and processes, and compares and analyzes trends in these data in order to derive actionable component performance data that enable staff in one or more regional asset operation control centers to adjust well flow and/or sub-systems to inhibit excessive wear and/or damage of the rotating equipment, wells and/or other facilities.

3. The method of claim 2 wherein, if vibration, temperature and/or pressure in a specific pump, compressor and/or other piece of rotating equipment is significantly higher than that of other similar rotating equipment, the actionable component performance data include a rotating equipment overload warning.

4. The method of claim 3 wherein, if vibration, temperature and/or pressure in a specific pump, compressor and/or other piece of rotating equipment is significantly higher than that of other similar rotating equipment, a regional total production optimization center generates actionable total asset control data, which comprise an asset operations scheme in which the performance of the specific pump, compressor and/or other piece of rotating equipment is reduced and/or recommendations are made to maintain, repair and/or replace the specific pump, compressor and/or other piece of rotating equipment within a specific period of time.

* * * * *